United States

Biet et al.

4,003,631

Jan. 18, 1977

[54] DEVICE FOR BLOCKING A LASER BEAM

[75] Inventors: Jean-Pierre Biet, Verrieres le Buisson; Michel Duchet, Briis Sous Forges, both of France

[73] Assignee: Compagnie Generale d'Electricite, Paris, France

[22] Filed: June 5, 1975

[21] Appl. No.: 584,227

[30] Foreign Application Priority Data

June 21, 1974 France .............................. 74.21625
Sept. 30, 1974 France .............................. 74.32861

[52] U.S. Cl. ..................... 350/160 R; 331/94.5 M; 331/94.5 K
[51] Int. Cl.² .......................................... G02F 1/16
[58] Field of Search ................. 350/160; 332/7.51; 331/94.5

[56] References Cited

UNITED STATES PATENTS

| 3,530,401 | 9/1970 | Garbuny et al. ............. 331/94.5 K |
| 3,555,455 | 1/1971 | Paine ........................... 331/94.5 M |

*Primary Examiner*—William L. Sikes
*Attorney, Agent, or Firm*—Sughrue, Rothwell, Mion, Zinn & Macpeak

[57] ABSTRACT

Device for blocking a laser return pulse reflected by a target lit up by an incident high power pulse. It comprises a semiconductive plate on the path of the incident and reflected pulses and means, for generating charge carriers in this semiconductive plate after the crossing by the incident pulse, in order to make it opaque for the reflected pulse and thus to avoid damaging of the laser pulse generator.

14 Claims, 6 Drawing Figures

DEVICE FOR BLOCKING A LASER BEAM

The present invention has as its object a device for blocking a laser beam.

It is known that certain laser generators suitable for emitting beams in the form of high-power pulses are used, for example, for interaction experiments. Generally, in such applications, the beam emitted strikes a target and it is necessary for the beam reflected by the said target to be blocked, so that it may not be reflected back and damage the generator.

It has been proposed, for that purpose, to use devices in which either a glass window showing, the Faraday effect, or, electro-optical modulators operating by Kerr effect or Pockels effect, are implemented.

Nevertheless, such substances have insufficient mechanical characteristics and are rapidly put out of use by high-power laser pulses.

The present invention makes it possible to overcome such disadvantages and it has as its object the producing of a device suitable for blocking a reflected laser beam while enabling the free passage of the incident beam, such a device having great simplicity of structure as well as high reliability.

The invention has as its object a device for blocking a laser beam reflected by a target lit up by an incident beam, that reflected beam propagating along an axis identical to that of the incident beam but in the reverse direction, characterized in that it comprises on the one hand a plate made of a semi-conductive substance arranged on the path of the said incident and reflected beams and suitable for being crossed by the said incident beam and, on the other hand, means for generating charge carriers on one of the faces of the said plate after the crossing of the said plate by the said incident beam and before the passing of the said reflected beam for these charge carriers to exist on the said face at the time when the said reflected beam reaches that face.

The invention is described herebelow by way of a purely illustrating example having no limiting character, with reference to the accompanying drawings, in which.

Figure 6:
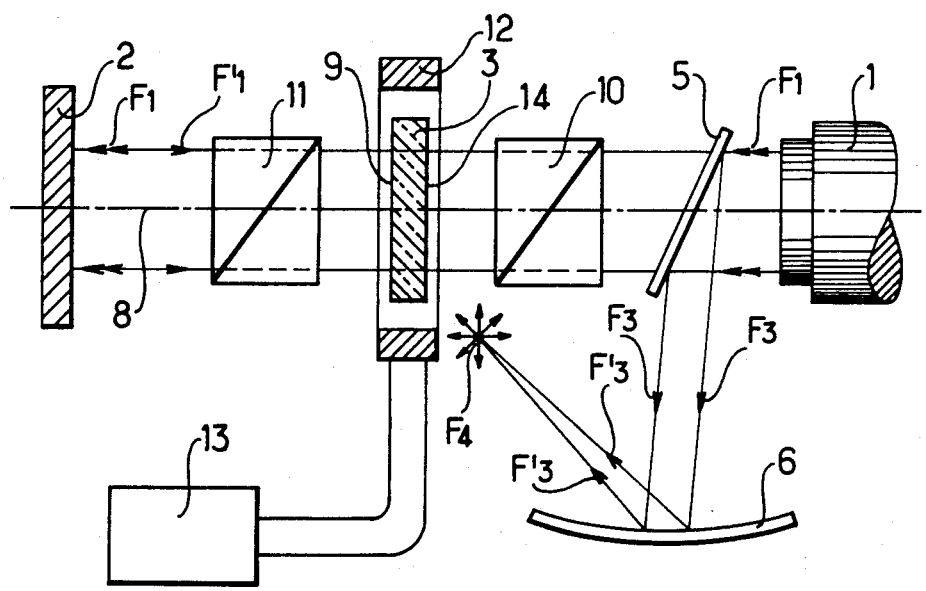

And FIG. 6 shows a sixth embodiment of the device according to the invention.

Figure 1:
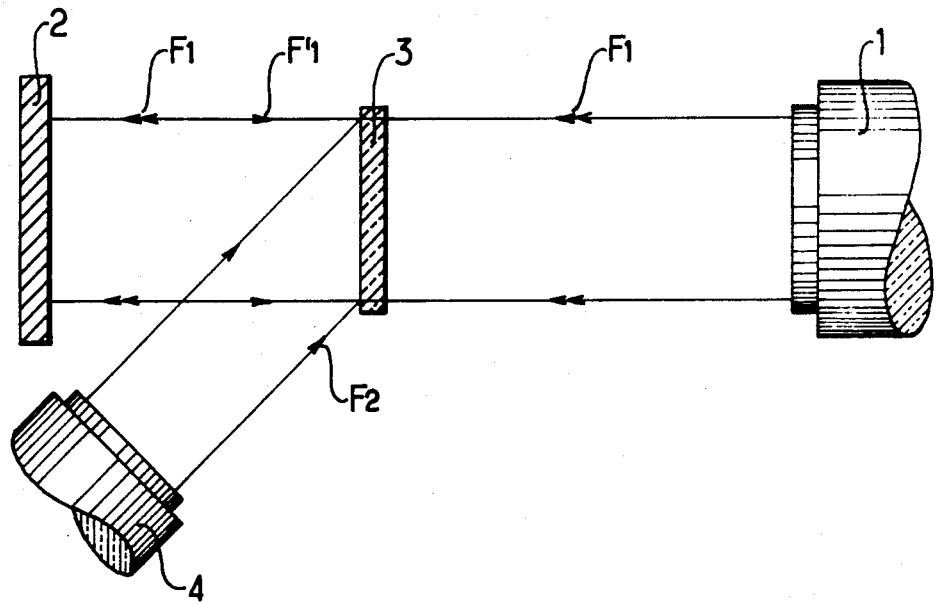
FIG. 1 shows a first embodiment of the device according to the invention.

FIG. 1 shows a laser generator 1 emitting a high-power light pulse materially shown by the arrows F1 in the direction of a target 2. After impact on the said target, such an incident beam F1 is reflected as materially shown by the arrows F'1.

According to the invention, a plate 3 made of a semi-conductive substance, in this case, germanium, is arranged on the path of the light pulse F1 perpendicularly to this path. Moreover, a laser generator 4 is suitable for emitting, towards the plate 3, pulses materially shown by the arrows F2, such pulses having a quantum light energy greater than the prohibited band width of the germanium.

Such a device operates as follows:

The laser generator 1 emits the incident pulse F1 which crosses the plate 3 and strikes the target 2; that pulse is reflected on the said target along F'1. Just before the said reflected pulse F'1 reaches the plate 3, the laser generator 4 emits a pulse F2. Such a radiation is absorbed by the plate 3 while generating, at its surface, free $n$ and $p$ carriers which absorb the said radiation F'1, thus preventing the latter from reaching the generator 1.

Of course, the quantum light energy of the incident pulse F1 as well as its wavelength are such that the plate 3 can be freely crossed by such a radiation.

Figure 2:
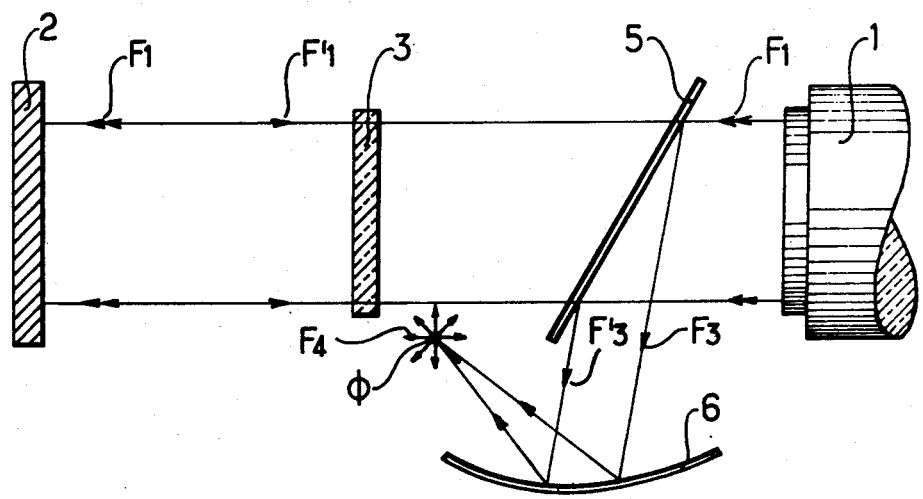
FIG. 2 shows a second embodiment of the device according to the invention.

FIG. 2 is a second embodiment of the device according to the invention.

In that case, a part F3 of the incident pulse F1 is directed by means of a plane semi-transparent mirror 5 onto a concave spherical mirror 6 arranged so that its focus point $\phi$ be in the immediate vicinity of the plate 3.

It will be seen that the beam F3 is reflected on the mirror 6 along F'3 and converges to the focus point $\phi$ where it generates a plasma.

Such a plasma emits a radiation materially shown by the arrows F4 whose quantum light energy is greater than the prohibited band width of the germanium.

It therefore generates, at the surface of the plate 3, electrons and free $n$ and $p$ carriers which block the reflected pulse F'1 resulting from the impact on the target 2 of the incident pulse F1 emitted by the laser generator 1.

Of course, the optical path constituted by the trajectories of the beams F3 and F'3 is predetermined as a function more particularly of the distance between the target 2 and the plate 3.

Figure 3:
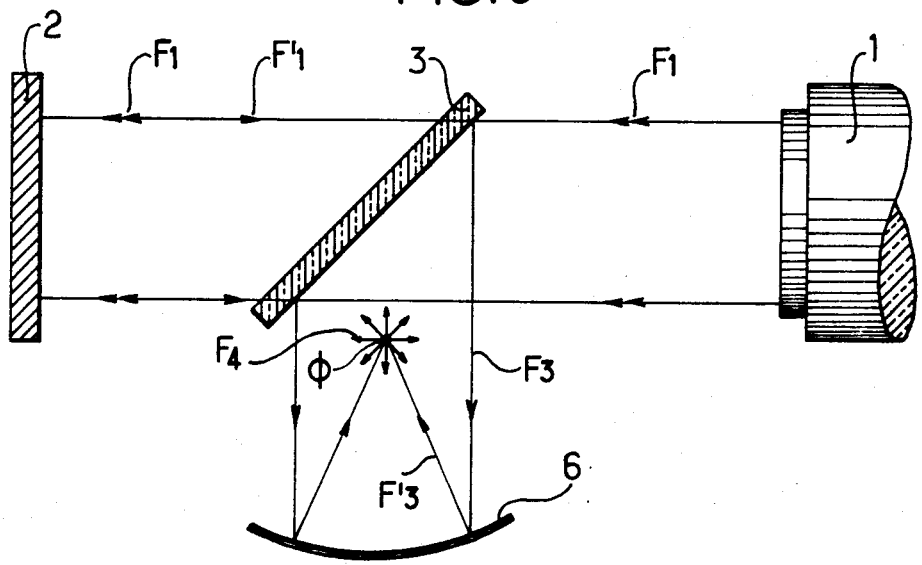
FIG. 3 shows a third embodiment of the device according to the invention.

In the embodiment illustrated in FIG. 3, no plane mirror 5 is used, but the plate 3 is inclined with respect to the incident pulse F1, at an angle close to Brewster angle so that a part F3 of the beam F1 be directed towards the concave spherical mirror 6 where it is reflected along F'3, generating, at the focus point $\phi$ the plasma such as mentioned in the previous case.

Figure 4:
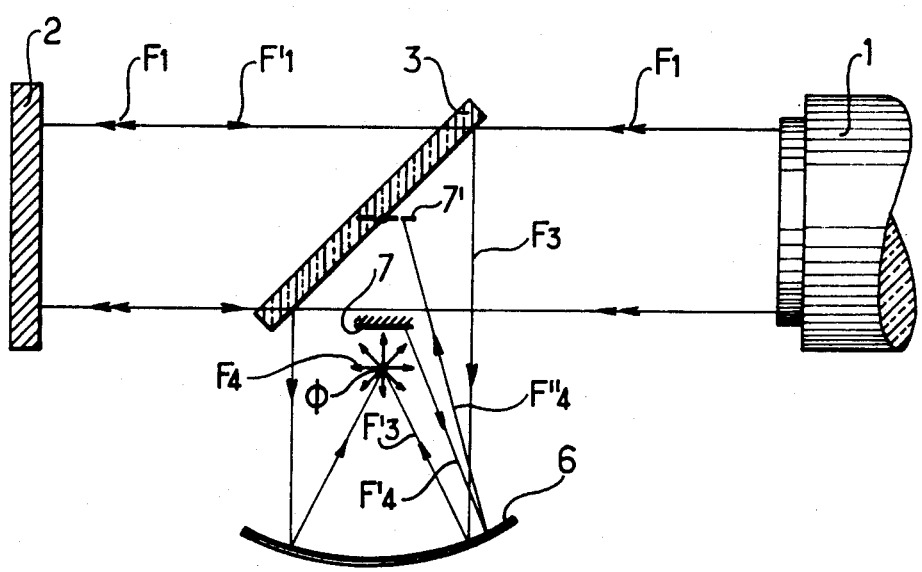
FIG. 4 shows a fourth embodiment of the device according to the invention.

The embodiment shown in FIG. 4 differs from the previous one in that a small plane mirror 7 is, moreover, arranged between the focus point $\phi$ of the mirror 6 and the plate 3. That mirror is arranged at such a distance from the said focus point $\phi$ that its optical image 7' in relation to the mirror 6 passes through the centre of the plate 3.

In this way, it will be seen that a ray such as F4 emitted by the plasma and which, without the existence of the mirror 7, would not strike the plate 3, is successively reflected by the said mirror 7 along F'4, then by the mirror 6 along F''4 to come into the vicinity of the centre of the plate 3.

The implementing of such a mirror 7 therefore makes it possible on the one hand, to reduce to a minimum the losses of energy of the radiation emitted by the plasma and, on the other hand, to obtain a greater concentration of light energy in the central region of the plate 3; this latter characteristic is a particular advantage, in the case where the pulse F1 has an energy spectrum of the Gaussian type and hence a maximum power at the centre of the beam. In this way, the efficiency of the blocking device as a whole is improved.

A slightly convex mirror (not shown) can also be used instead of the plane mirror 7; in that case, practically no ray F4 emitted by the plasma is sent back on the plasma itself, which, as is known, has a certain opacity. The efficiency of the device is further improved thereby. It will be observed that in the examples described in FIGS. 3 and 4, the optical path constituted by the trajectories of the beams F3 and F'3 is predetermined as a function, more particularly, of the distance between the target 2 and the plate 3.

It should, moreover, be observed that plate 3 made with other semi-conductors such as silicon or the like can be used instead of germanium provided that these latter be transparent to the wavelengths of the incident pulses.

Figure 5:
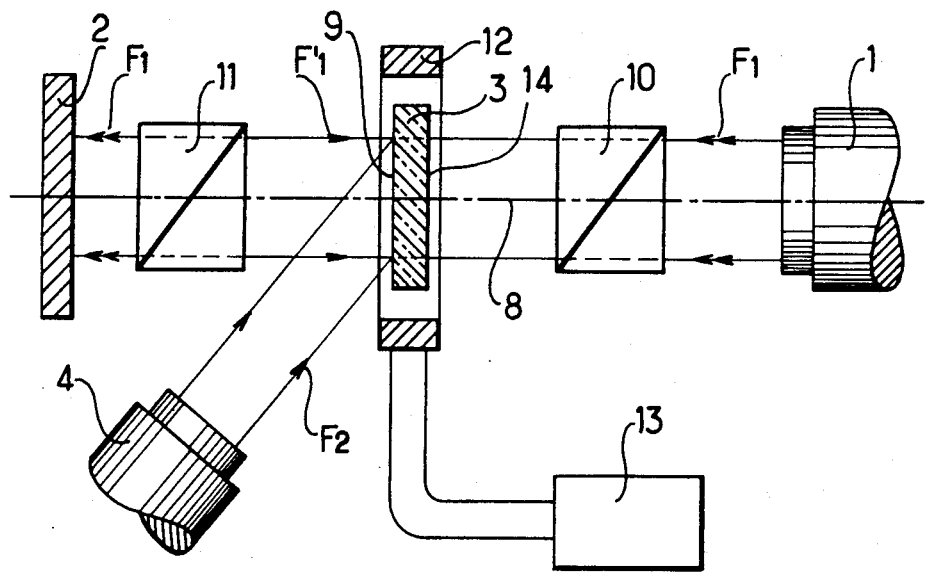
FIG. 5 shows a fifth embodiment of the device according to the invention.

FIG. 5 shows a laser generator 1 such as a carbon dioxyde laser, emitting, along an axis 8, a high-energy light pulse, for example of 500 milli-Joules per square centimetre of the cross-section of the beam, materially shown by the arrows F1. A plate 3 whose thickness can be a few millimetres and which is made of a semi-conductive substance such as germanium, transparent to the pulse F1 is arranged on the path of that pulse. The light pulse leaving the plate 3 strikes a target 2 giving rise to a beam F'1 reflected by that target towards the plate 3 along the same axis 8 as the incident beam but in the reverse direction. Another laser generator 4, for example a glass laser doped with neodyme is arranged to emit a light pulse F2 whose density of energy can be in the order of 50 milli-Joules per square centimetre, towards a face 9 of the plate 3.

A polarizer 10 and an analyzer 11, suitable for generating a rectilinear polarization of the beams F1 and F'1 in a same plane passing through the axis 8 are arranged on either side of the plate 3 on the path of the beams F1 and F'1. An induction coil 12 generating a magnetic field which can be of 50,000 Gauss, through the plate 3, is also arranged round the plate 3. The two input terminals of the coil 12 are connected respectively to the two output terminals of an electric voltage generator 13 which can be a pulse generator.

Such a device operates as follows:

After passing in the polarizer 10, the beam F1 is polarized in a plane passing through the axis 8. That polarized beam crosses through the plate 3 and the analyzer 11 whose polarization plane is the same as that of the polarizer 10. The incident beam F1 gives rise, after reflection on the target 2, to a radiation of depolarized light. But, after passing in the analyser 11, the reflected beam F'1 is again polarized in the same plane as the incident beam.

The beam F2 emitted by the laser 4 has a quantum energy greater than the width of the prohibited band of the semiconductive substance of the plate 3. That beam F2 therefore generates, on the face 9 of the plate 3, n and p charge carriers. The beam 2 is generated after the crossing of the plate 3 by the incident beam and a very short instant before the beam F'1 strikes the plate 3 so that the charge carriers exist on the face 9 at the time when the beam F'1 strikes that face. These charge carriers absorb a part of the energy of the beam F'1.

The magnetic field generated by the coil 12 through these charge carriers makes the plane of polarization of the non-absorbed part of the beam F'1 rotate about the axis 8 by Faraday effect. That non-absorbed part is therefore polarized in a plane which forms a certain angle with that of the polarizer 10 and is therefore blocked when it reaches the level of that polarizer.

Rotation by Faraday effect takes place only if the charge carriers exist on the face 9. The coil 12 can therefore be energized permanently by the voltage generator 13. But in a preferred embodiment of the invention, the generator 13 is a pulse generator, the length of the pulses sent out by that generator 13 possibly being chosen very much greater than that of the pulse emitted by the generators 1 and 4 to avoid difficulties in synchronization.

The intensity of the magnetic field emitted by the coil 12 is chosen preferably so that the rotation by Faraday effect be in the order of 90°, in order to generate a very effective blocking of the reflected beam.

In FIG. 6, it will be seen that the means for generating charge carriers on one face of the plate 3 comprise a semi-transparent mirror 5 and a concave mirror 6, the mirror 5 reflecting a part of the beam F1 on the mirror 6 along a beam F3, that mirror 10 being arranged so as to send the beam F3 back along a beam F'3 focussed at a point close to one face 14 of the plate 3, so as to generate, at that point, a plasma emitting a radiation materially shown by the arrows F4, the quantum energy of that radiation being greater than the width of prohibited band of the semiconductive substance of the plate 3. That radiation generates on the face 14 of the plate 3 charge carriers which cause, as in the case of the device illustrated by FIG. 1, a partial absorption of the beam F'1 and due to the coil 12, a rotation of the polarization plane of the non-absorbed part of that beam. The optical path corresponding to the trajectory of the beams F3 and F'3 is predetermined so that the charge carriers be on the face 14 at the time of the passing of the reflected beam F'1 and do not exist there at the time of the passing of the incident beam F1.

The devices described hereinabove and illustrated by FIGS. 1 to 6 make it possible to obtain a blocking of a laser beam, that blocking being particularly energetic in the case illustrated by FIGS. 5 and 6. They can be applied to the blocking of high-power laser pulses after reflection on a target.

We claim:

1. In a laser apparatus including a laser generator for emitting a laser beam along an optical axis in a forward direction to a target which reflects the beam in the reverse direction along the axis back to the laser generator, the improvement comprising:
    a. a plate made of a semi-conductive substance positioned on the axis between the laser generator and the target and having opposite parallel first and second faces, said plate being positioned so that said faces are sequentially crossed by the emitted laser beam, said plate being transparent to the emitted beam; and
    b. means for rendering said plate opaque to the reflected beam, said rendering means comprising means for generating charge carriers on one of the plate faces after the plate is crossed by the emitted beam and before the reflected beam reaches the plate in the reverse direction, thereby blocking transmission of the reflected beam through the plate and preventing the laser generator from being damaged by the reflected beam.

2. The improvement according to claim 1 wherein said means for generating charge carriers on said one face of said plate comprises a semi-transparent plane mirror positioned on said axis between said plate and said target, said mirror reflecting a part of the power of the emitted beam along a path off said axis, and a concave spherical mirror positioned in said path to focus said part of the power of the emitted beam on a point in the immediate vicinity of said one face of said plate to generate a plasma which illuminates said one face to generate the charge carriers.

3. The improvement according to claim 2 wherein the opposite faces of said plate are substantially perpendicular to said axis and to the emitted beam.

4. The improvement according to claim 1 wherein said plate is inclined to said axis to direct a part of the power of the emitted beam along a path off said axis, and further comprising a concave mirror positioned in said path to focus said part of the power of the emitted beam on a point in the immediate vicinity of said one face of said plate to generate at said point a plasma which illuminates said one face to generate the charge carriers.

5. The improvement according to claim 4 further comprising a mirror positioned between said point and said plate and at a distance from said point such that its optical image in relation to said spherical mirror passes through the center of said plate.

6. A laser device according to claim 5 wherein said mirror positioned between said point and said plate is a plane mirror.

7. A laser device according to claim 5 wherein said mirror positioned between said point and said plate is a convex mirror.

8. A laser device according to claim 4 wherein said plate is inclined on said axis with respect to emitted beam at an angle close to the Brewster angle.

9. The improvement according to claim 1 further comprising a polarizer and an analyzer arranged respectively on either side of the said plate on said axis to generate a rectilinear polarization of said emitted beam and the beam reflected by said target in a same plane passing through the said axis, and means for generating through the said one face a magnetic field capable of causing a rotation, about said axis, of the plane of polarization of the non-absorbed part of the beam reflected by said target at the time when that non-absorbed part crosses said one face.

10. The improvement according to claim 9 wherein said means for generating a magnetic field across said one face comprises an induction coil arranged around said plate and having two input terminals, and an electric voltage generator having two output terminals connected to said two input terminals, respectively.

11. The improvement according to claim 10 wherein said electric voltage generator is an electric pulse generator.

12. The improvement according to claim 1 wherein said means for generating charge carriers comprises an additional laser generator located off said axis and directing onto said one face a laser pulse whose quantum energy is greater than the prohibited width of the band of the semi-conductive substance.

13. The improvement according to claim 1 wherein the semi-conductive substance is germanium.

14. A method of preventing a laser pulse emitted by a laser generator from being reflected by a target back to the source, the emitted and reflected pulse travelling in opposite directions along a common optical path between the target and the generator, the method comprising the steps of:
   a. positioning in the common optical path a plate of semi-conductive substance which is transparent to the emitted pulse and which has two opposed parallel faces which are sequentially traversed by the emitted pulse while passing through the plate; and
   b. after the emitted pulse has passed through the plate but before the reflected pulse reaches the plate, rendering the plate opaque to the reflected pulse by generating charge carriers on one of the faces of the plate, thereby preventing the reflected pulse from reaching the laser generator.

* * * * *